(No Model.) 6 Sheets—Sheet 2.
T. ROBERTSON.
LOZENGE MACHINE.
No. 363,681. Patented May 24, 1887.
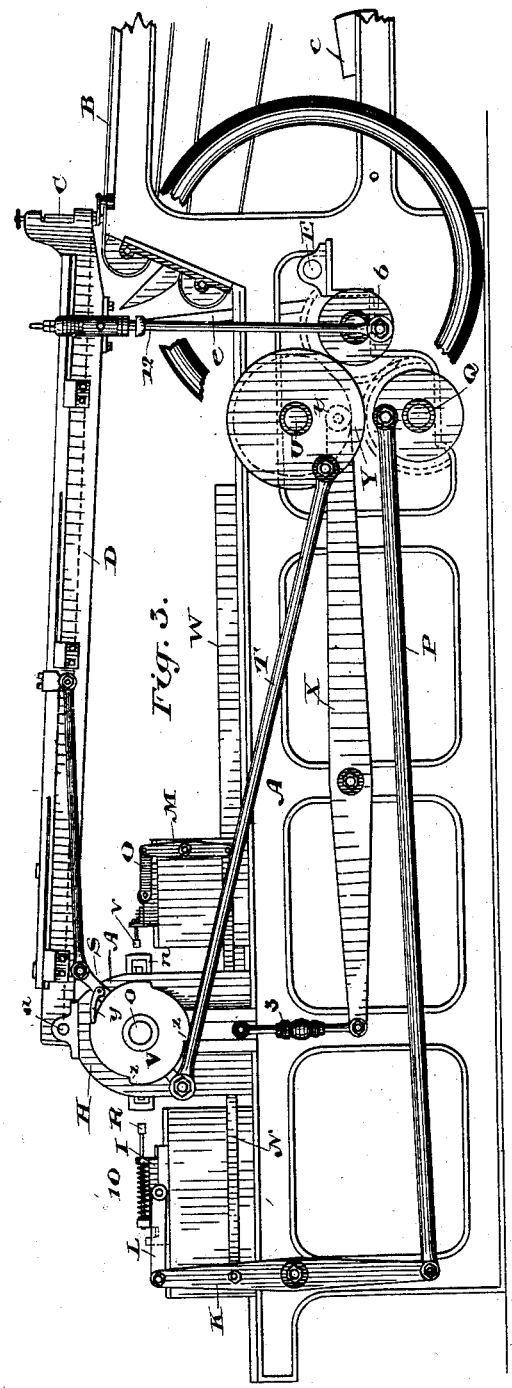
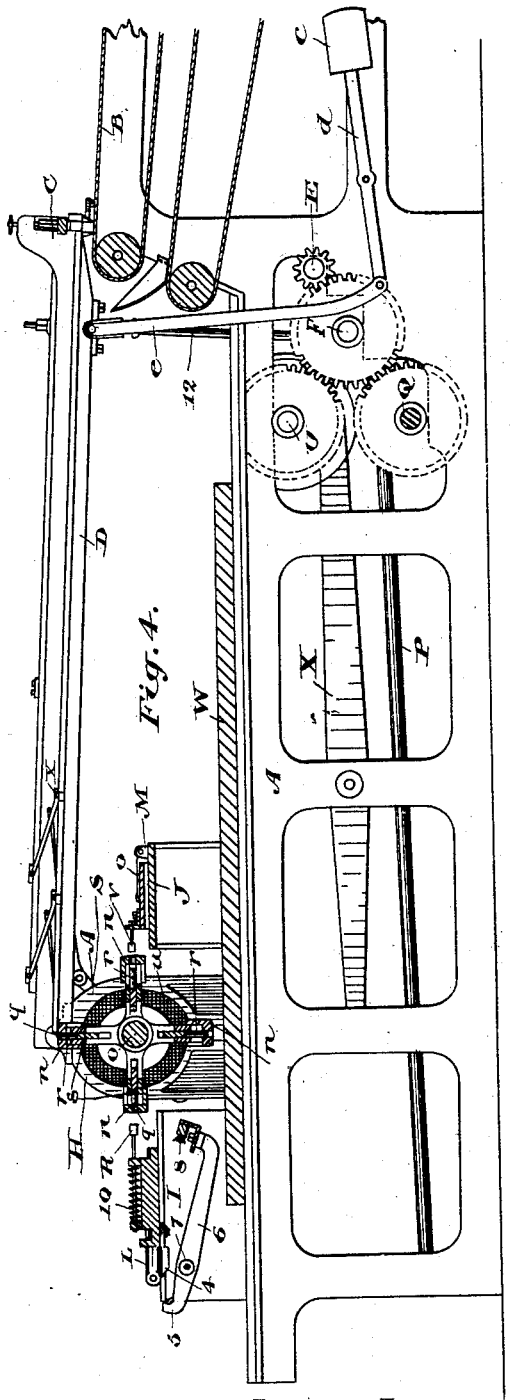
Witnesses.
J. B. Featherstonhaugh
Charles E. Baldwin
Inventor.
Thos Robertson
by Donald C. Ridout & Co
Atty (No Model.) 6 Sheets—Sheet 3.

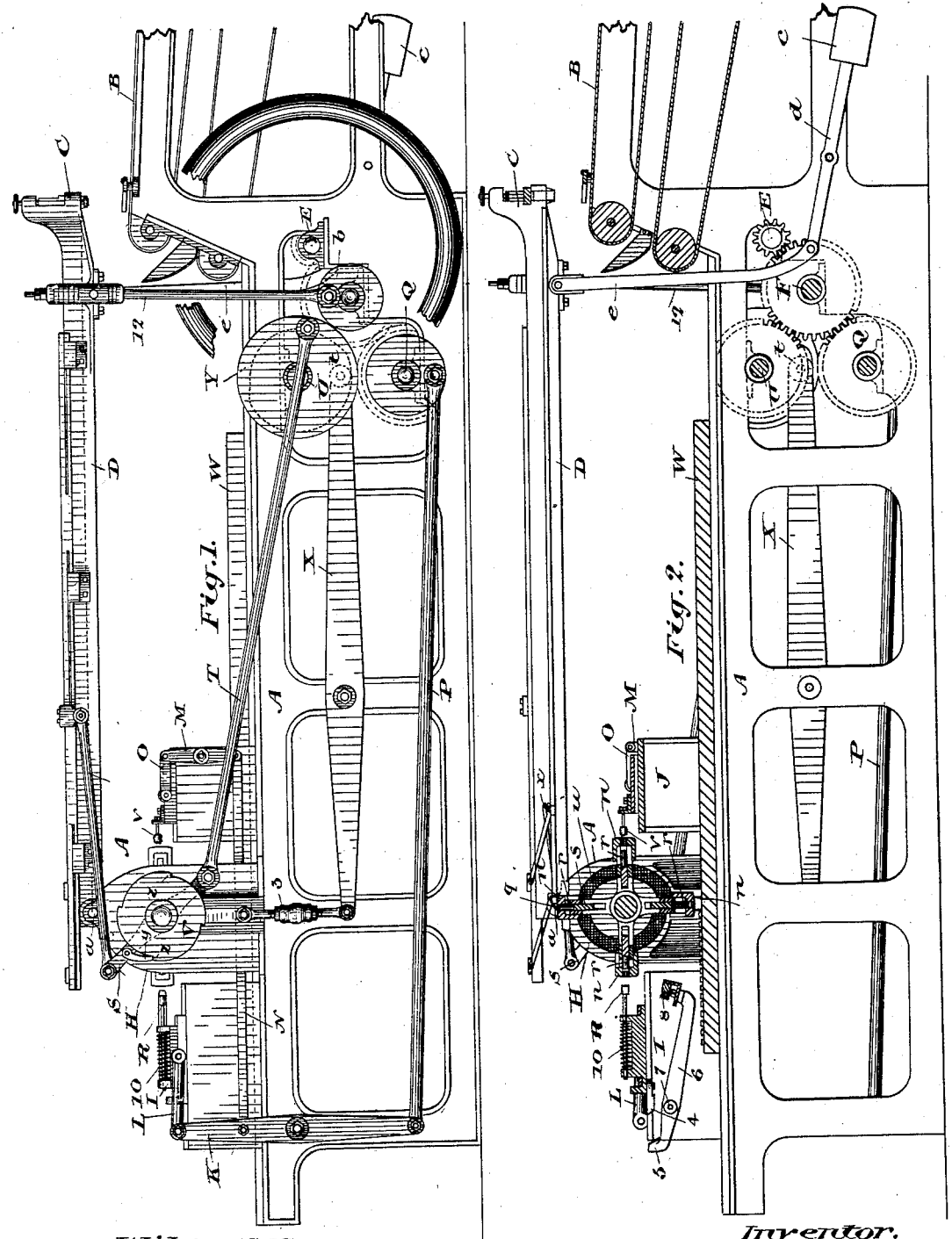

T. ROBERTSON.
LOZENGE MACHINE.

No. 363,681. Patented May 24, 1887.

Witnesses. Inventor:
J. B. Fetherstonhaugh Thos Robertson
Charles C. Baldwin by Donald C. Ridout & Co (No Model.)

6 Sheets—Sheet 4.

T. ROBERTSON.
LOZENGE MACHINE.

No. 363,681. Patented May 24, 1887.

Witnesses.
J. B. Fetherstonhaugh
Charles C. Baldwin

Inventor:
Thos Robertson
by
Donald C. Ridout & Co
Attys (No Model.)  6 Sheets—Sheet 5.
T. ROBERTSON.
LOZENGE MACHINE.

No. 363,681.  Patented May 24, 1887.

(No Model.)

T. ROBERTSON.

LOZENGE MACHINE.

No. 363,681.    Patented May 24, 1887.

Witnesses.
F. B. Fetherstonhaugh
Charles C. Baldwin

Inventor:
Thos Robertson
by Donald C. Ridout & Co
Attys

UNITED STATES PATENT OFFICE.

THOMAS ROBERTSON, OF TORONTO, ONTARIO, CANADA.

LOZENGE-MACHINE.

SPECIFICATION forming part of Letters Patent No. 363,681, dated May 24, 1887.

Application filed June 6, 1885. Renewed October 18, 1886. Serial No. 216,589. (No model.)

*To all whom it may concern:*

Be it known that I, THOMAS ROBERTSON, of the city of Toronto, in the county of York, in the Province of Ontario, Canada, manufacturer, have invented certain new and useful Improvements in Lozenge-Machines, of which the following is a specification.

The invention relates to certain improvements upon a lozenge-machine fully described in specifications attached to United States patents issued to me on January 4, December 26, 1876, and May 9, 1882, to which specifications I refer for any details of description not found in the following specification, which will be directed merely to explain the immediate improvements involved in my present invention, the object of the present improvements being to insure greater accuracy in the printing and embossing of the lozenges, and at the same time to impart a higher and more complete finish to each lozenge; and it consists, more particularly, in arranging a device by which each lozenge, after being cut from the sheet of paste, is pressed into a mold, where it is embossed or printed and then deposited upon a traveling tray on which the lozenges are arranged in rows, ready to be placed in the drying-room.

Figure 5:
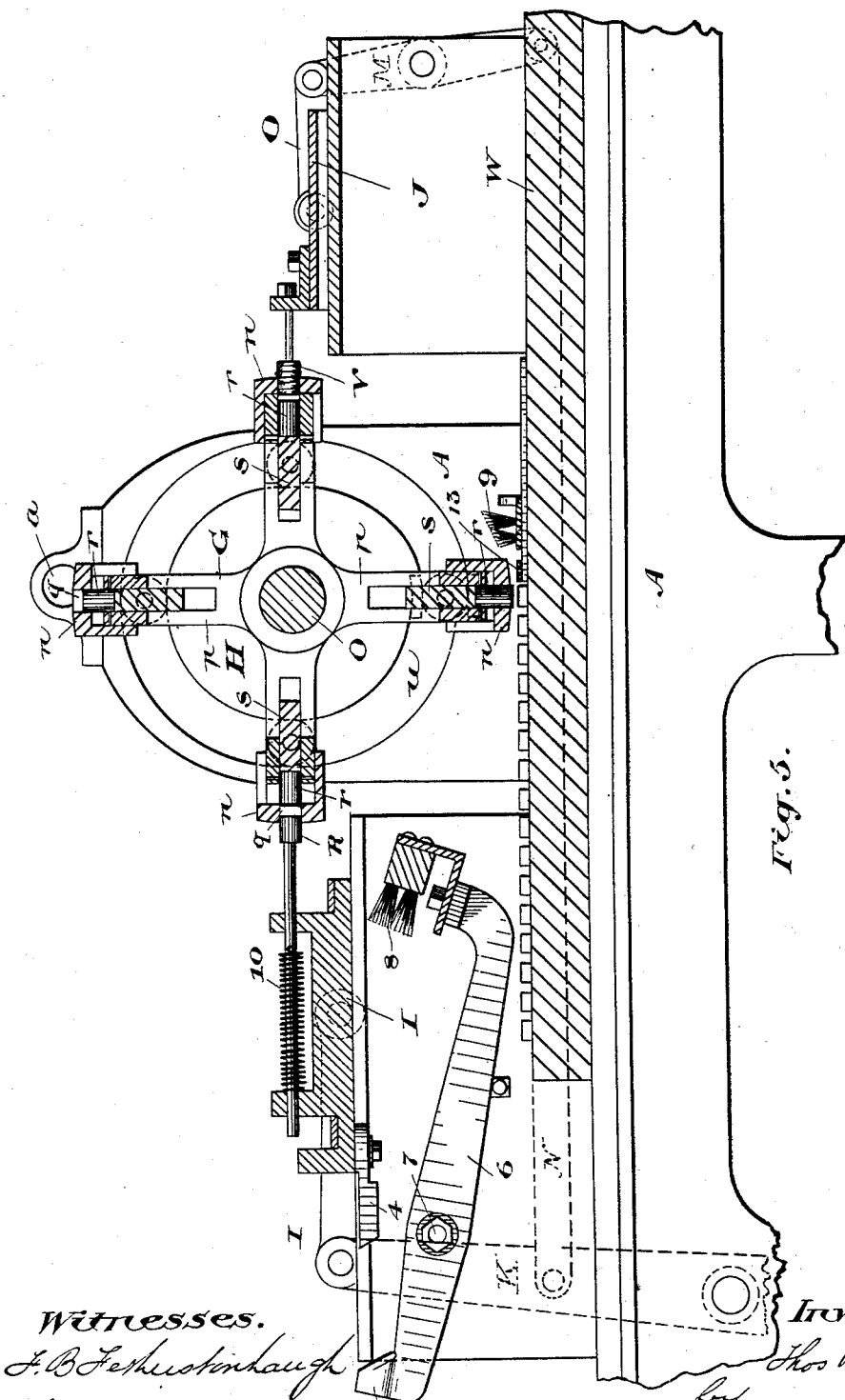
Figure 6:
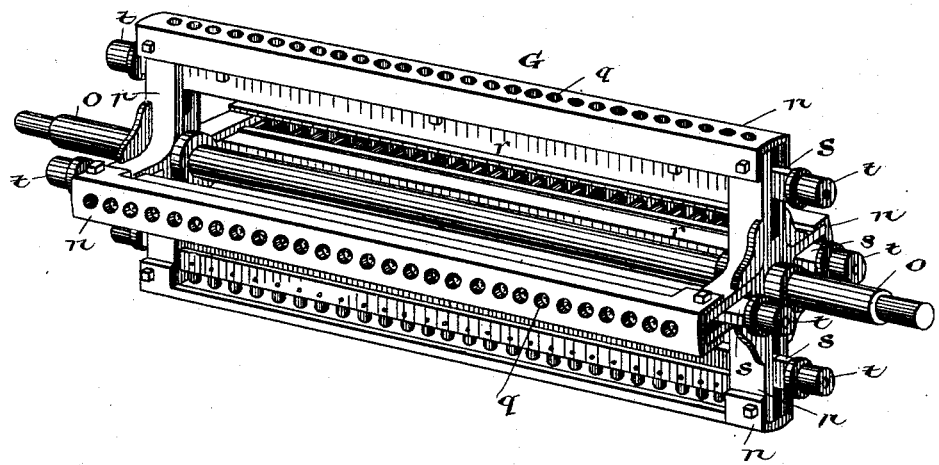
Figure 7:
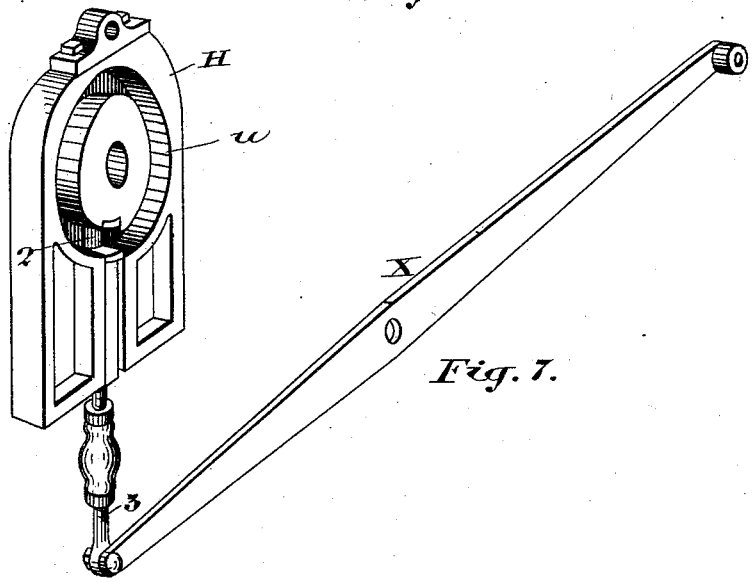
Figure 9:
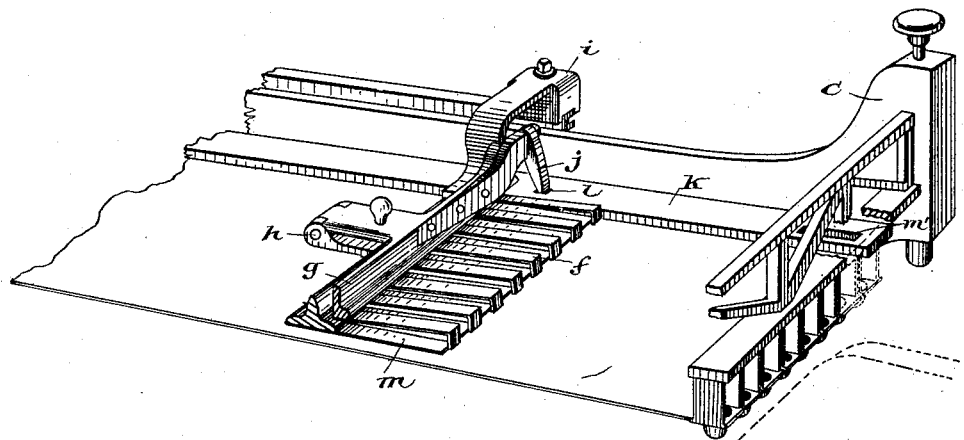
Figure 8:
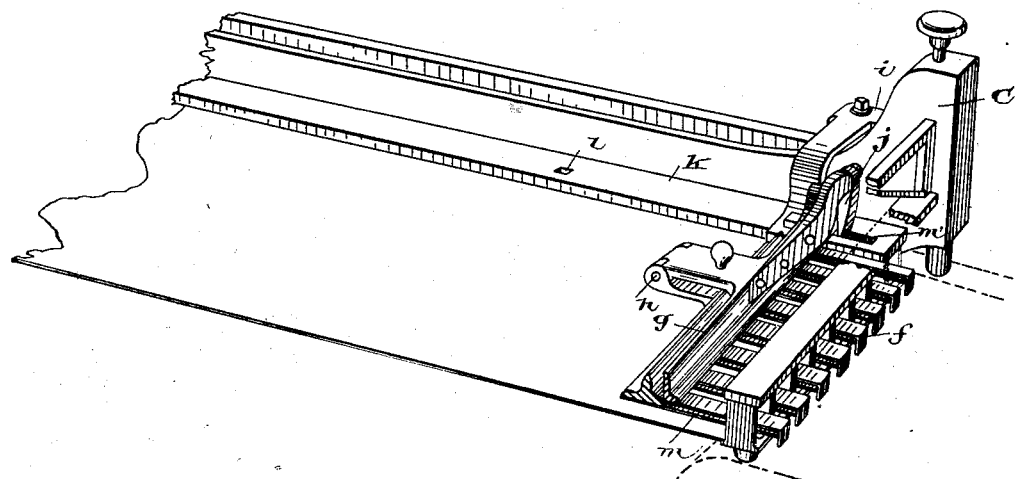
Figure 10:
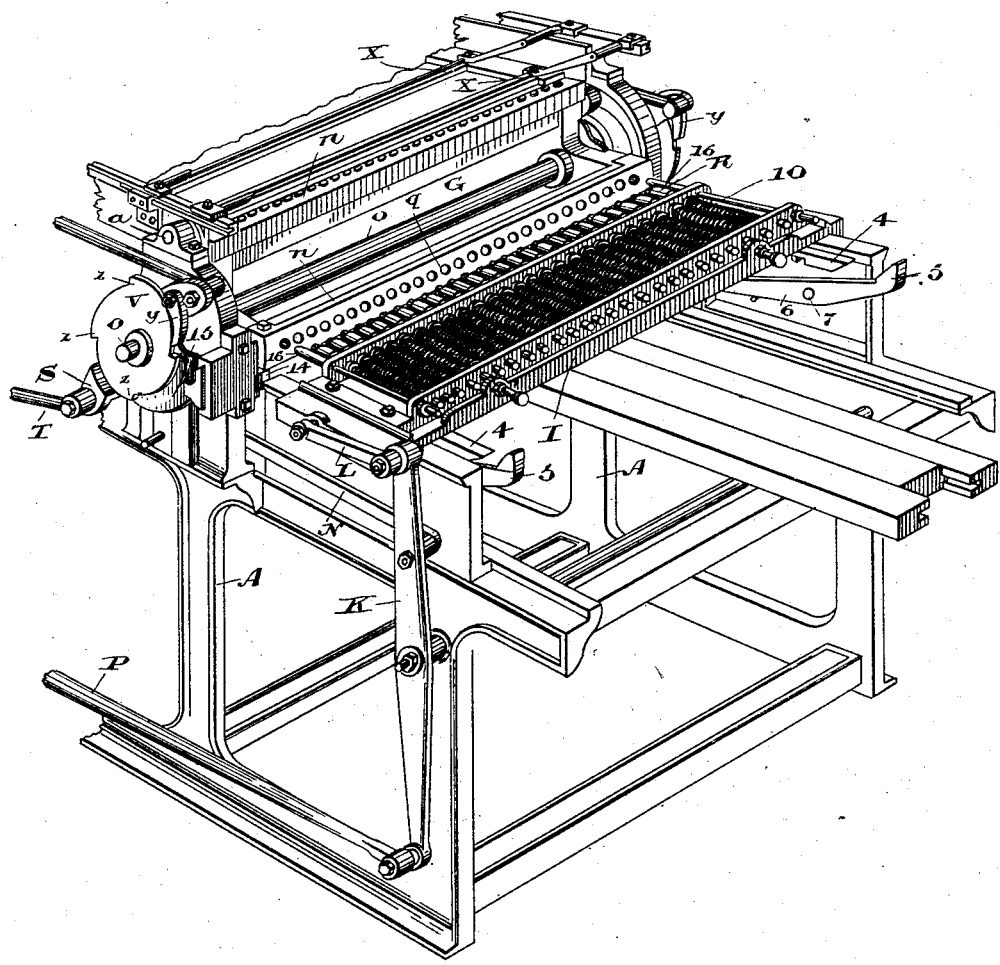

Figure 1 is a side elevation, showing the position of the mechanism before the cutters have been brought down upon the paste. Fig. 2 is a sectional side view showing the mechanism in the same position as in Fig. 1. Fig. 3 is a side elevation showing the position of the mechanism when the cutters have been brought down upon the paste. Fig. 4 is a sectional side view showing the mechanism arranged as in Fig. 3. Fig. 5 is an enlarged sectional side view of the molding-cylinder and its connections. Fig. 6 is a perspective detail of the molding-cylinder. Fig. 7 is a perspective detail of the cam and its lever for operating the plunger in the molding-cylinder. Figs. 8 and 9 are perspective details, partially in section, showing the means for lifting the fingers employed in drawing the lozenges out of the cutters. Fig. 10 is a perspective view of the machine.

In the drawings all parts marked A represent the main or stationary frame of the machine.

B represents the traveling apron, upon which the sheet of paste is conveyed to the cutters.

C is the cutter-head, which is attached to or forms part of the table D, which is hinged at *a* to the frame A. This table D extends across the full width of the machine, the said width being regulated according to the number of cutters in the head C.

E is the main driving-axle of the machine, and derives motion from any primary motor desired. All the moving parts of the machine are geared to and derive motion from the axle E.

12 is a connecting-rod attached at its upper end to the table D and at its bottom end to a crank, *b*, connected to the axle F, which is geared to and derives motion from the main axle E, as indicated in Fig. 2.

*c* is a balance-weight connected to the end of the lever *d*, which is pivoted to the main frame A, and is connected by the rod *e* to the table D, for the purpose of balancing the weight of the said table.

When the axle F revolves, the table D, being hinged at *a*, derives a vertically-reciprocating movement which is designed to bring the cutters against and away from the sheet of paste alternately, each downward movement of the cutter-head C being designed to cut out from the paste a row of lozenges. As the head ascends, the fingers *f* (see Figs. 8 and 9) draw from each cutter a lozenge. As these fingers are attached to the frame which operates the push-bars, as fully described in my American patent issued on May 9, 1882, it is not necessary here to describe the construction and operation of the said push-bars, it being merely necessary to say that the fingers *f* draw the lozenges from the cutters to a position where they may be reached by the push-bars, which operate and are constructed in the same manner as the push-bars described in said patent, my present reason for referring to the fingers being merely to explain how I clear the fingers from the lozenges after they have been drawn by the said fingers into range of the push-bars, which, as before stated, are operated as described in my former patent. The fingers *f*, it will be noticed, are connected to a head, *g*, which is hinged at *h* to the push-bar frame *i*. A cam finger or pawl, *j*, is secured on each side of the head *g*, and is slightly longer than the distance from its pivot to the top of the ledge $k$. When the fingers have reached the position in which they are shown in Fig. 9, the lozenges have been drawn into range of the first push-bar. At this point the finger or pawl $j$ falls into a notch, $l$, made in the ledge $k$, and as the head $g$ commences to travel back toward the cutter-head C the pivoted finger $j$ raises the said head on its hinge $h$, lifting the fingers $f$ clear of the lozenges, and in the event of the said fingers lifting any of the lozenges, any so lifted will be pushed down by coming in contact with the spring-plates $m$. When the head $g$ returns to obtain a fresh supply of lozenges, as indicated in Fig. 8, the pawl $j$ falls into the slot $m'$ made in the plate $k$, which slot is sufficiently large to allow the pawl $j$ to swing on its pivot without raising the head $g$; or, in other words, the pawl $j$ swings freely on its pivot when over the slot $m'$, so that on the return-stroke of the head $g$ the pawl $j$ assumes the angle it is indicated in in Fig. 9, so as to be in a position to act when the head returns. The row of lozenges deposited within range of the push-bars are then drawn forward by the action of the said push-bars until they reach the end of the table D at which the molding-cylinder G is located. I term this a "molding-cylinder," although strictly speaking it is not a cylinder, being merely four bars, $n$, running parallel with the axle $o$, and supported by heads $p$, which are fastened to the axle $o$. Each of these bars $n$ has a series of holes, $q$, pierced in it, which holes represent the size and shape of the lozenges to be molded, and are the same distances apart as the cutters, so that each lozenge cut finds a corresponding hole in the particular bar $n$ which happens to be at the end of the table D when the lozenges are drawn from the said table onto the top of the bar $n$. Consequently, each lozenge so drawn is deposited into one of the holes $q$.

On reference to Figs. 2, 4, and 5 it will be noticed that each hole $q$ is provided with a plunger, $r$, which plungers are attached to a bar, $s$, extending from one head to the other, and has friction-rollers $t$ journaled on each of its ends. The axle $o$ is supported at each end by a bracket, H, which is suitably fastened to the main frame A. On the inside surface of each of these brackets a cam-groove, $u$, is made so as to receive the friction-rollers $t$, and is shaped so as to operate the plungers $r$ in the manner and for the purposes hereinafter described.

A carriage, I, is supported in suitable guides on the frame A and extends across the machine. A corresponding carriage, J, is similarly supported and is located on the opposite side of the cylinder G.

An arm, K, is pivoted on each side of the frame A, and its upper end is connected to the carriage I by the link L.

An arm, M, is pivoted on each side of the frame A, and is connected to the arm K by the rod N, its other end being connected to the carriage J by the link O. The lower end of the arm K is connected by the rod P to a crank-pin attached to and operated by the shaft Q, which derives motion, as indicated in Figs. 2 and 4, from the main axle E.

A row of plungers, R, are supported in suitable journals on the carriage I, and are designed so that each hole $q$ shall have a plunger R immediately opposite to it when in a horizontal position. These plungers R are shaped so as to fit the holes $q$, and have their ends plain or engraved, so that when they are brought into contact with the lozenges within the hole $q$ a corresponding impression will be stamped upon the lozenges.

On the carriage J a series of circular cleaning-brushes, $v$, are arranged so as to come opposite to the holes $q$, as indicated in Fig. 5.

It will be noticed that there are four bars, $n$, set at right angles to each other, so that when two are vertical the other two are horizontal. These bars are made to change places in the following manner: An arm, S, is pivoted loosely upon the axle $o$. One end of this arm is connected by the rod T to a crank attached to the axle U, which is geared to and derives motion from the main driving-axle, as indicated in Figs. 2 and 4. The other end of the arm S is connected to the frame of the push-bars $x$, which, as before explained, operate in the same manner as that in which they are described in the patent before referred to. The revolving of the axle U imparts a reciprocating motion to the frame of the push-bar $x$, and as I wish the molding-cylinder G to revolve, so as to operate in connection with the reciprocating motion of the push-bars, I place a pawl, $y$, on the arm S and secure a disk, V, to the axle $o$. This disk V has notches $z$ cut in its periphery, which notches are four in number and at equal distances apart, corresponding with the four bars $n$ of the molding-cylinder G. At each backward stroke of the arm S the pawl $y$ is brought into contact with one or other of the notches $z$, so that at the forward stroke of the arm S the disk V is caused to make one-fourth of a revolution, thereby bringing the bar $n$ which was standing at the top of the cylinder down to its horizontal position opposite to the plungers R, each of the other bars simultaneously being changed in their position. It therefore follows that when the holes in the top bar $n$ are filled with lozenges by the action of the push-bar $x$ the said bar $n$ is brought opposite to the plunger R, which is then actuated by the mechanism hereinbefore described, so as to press the lozenges into their respective holes and thereby finish them, as mentioned. By the time that the mechanism hereinbefore described is ready to move the molding-cylinder another quarter of a turn the plungers R have been withdrawn from their respective holes, and when the bar which has thus been filled reaches its bottom position the finished lozenges are deposited upon the tray W. As the lozenges thus pressed into the holes would not fall out of their own accord, I form a movable gate, 2, in the cam-groove u. This gate is exhibited in Fig. 7, and it will be noticed is connected by the rod 3 to the pivoted lever X, the opposite end of which is provided with a friction-roller resting upon a cam, Y, attached to the axle U. This cam Y is so shaped that the lever X is tilted just at the moment that the friction-roller t enters the gate 2, and consequently the plungers attached to the bar s provided with the particular roller entering the gate, as referred to, are forced down, so as to press out from the holes the lozenges which had previously been pressed into them by the action of the plungers described. The next time that the cylinder G is caused to revolve the plate n thus emptied of its lozenges is brought opposite to the brushes v, which are forced into the holes simultaneously with the plungers R on the opposite side, whereby each hole is cleaned out preparatory to being brought into the vertical position ready to receive the next supply of lozenges. When the carriage I is moved back, as hereinbefore described, its end 4 comes in contact with the projection 5 formed on the end of the lever 6. This lever is pivoted at 7 to some convenient point in the frame A. By coming in contact with the projection 5 that end of the lever 6 is pushed down, and of course the opposite end is correspondingly moved up, so as to bring the brushes 8, which are attached to the end of the lever, against the plunger R, so as to thoroughly clean them. A brush, 9, which extends across the machine at the point indicated, brushes off and cleans the ends of the plungers r as they are carried past when moving with revolving cylinder G. By this arrangement the faces of both plungers R and r are kept clean to insure their perfect action.

I may mention here that each plunger R is attached to a spindle, which passes freely through holes made in the carriage I, and is provided with a spiral spring, 10, arranged to hold the spindle sufficiently stiff to enable them to perform their work, while at the same time give a little where the necessity occurs.

From the foregoing description and on examination of the drawings it will be evident that the cam u is shaped for the purpose of imparting the necessary movements to the bar s, on which the plungers r are attached; but in order to make the matter clearer I may mention that the said cam u is so shaped that the plungers r, when the plate is in position to receive the lozenges, are almost flush with the surface of the bar n, so that when the lozenges are deposited in the holes they will each rest upon their respective plunger. When the bar thus filled with lozenges is moved from its first position to the horizontal position opposite to the plungers R, the cam u is so shaped as to draw the plungers r into the plate, thereby permitting the lozenges to recede into the holes q. After the plungers R have entered the holes q and compressed or molded the lozenges within them, the plate n, with the lozenges so molded, moves the next quarter of a turn, and the cam u is so shaped that during the movement from a horizontal to the downward vertical position of the plate n the plungers r will be withdrawn slightly back, so as to clear them of the lozenges. So soon as the gate 2 is reached the plungers return against the lozenges and push them out, as before described, onto the tray W. After having so discharged the lozenges the cam u is so shaped that the ends of the plungers r shall remain outside of the plate n until they have passed the brush 9, after which they are retreated until they are clear of the plate n, so that the brushes v pass entirely through the said plate when cleaning the holes. After this point the cam is shaped so as to bring the plungers r back into their initial position.

There are two other points of importance that I have omitted to refer to, the first one of which consists in placing a stationary plate, 13, in such a position that the plungers r must pass close to the plate after having discharged the lozenges from the plate n. This plate 13 is provided for the purpose of knocking off any lozenges which may happen to adhere to the plungers r. By this plate the positive delivery upon the tray W of every lozenge is insured. I have not referred to any mechanism for moving the tray W, as the means for doing so is fully described in my former patents referred to in this specification. The second point of importance which I have not referred to before is a stop, 14, provided for the purpose of arresting the motion of the cylinder G. This stop 14 is held in a suitable guide formed in the frame A, and is operated by a cam, 15, placed upon the axle o. This cam is so shaped that the stop 14 is thrown out so as to extend below the plate n when it comes opposite to the plungers R, and is withdrawn by the action of the cam in time to allow the next movement of the cylinder. At each end of the carriage I a finger, 16, is fixed. The end of this finger extends slightly beyond the plungers R, and is tapered, so that when the carriage I is thrown forward toward the bar n the tapered ends of the fingers enter holes made in the bar n, so as to hold the said bar stationary in its exact position ready to receive the plungers R.

I am aware of the English Patent No. 711 of 1857, in which the lozenges are cut in proximity to the cylinder, and make no claim to such construction. I deem it important that the lozenges be cut at a distance from the cylinder and that the carrier convey nothing but the lozenges—not the scrap—to the cylinder. Where the lozenges are cut in close proximity to the cylinder the scrap is liable to interfere with the perfect operation of the machine.

I am also aware of the patent to Fairlamb and Dunott, June 13, 1831, in which a spring-scraper is used; but said scraper is liable to distort the crackers, and does not deposit them in their proper order on the tray. By arranging the stationary plate 13 substantially under the axis of the cylinder the lozenges, should any adhere to the plungers, are removed in perfect condition into their proper place on the carrier.

What I claim as my invention is—

1. The combination, with a series of cutters, a cylinder having corresponding radial holes arranged in series, as shown, and a carrier arranged between said cutters and cylinder, of plungers, as R, and expelling-plungers, as $r$, the carrier depositing the cut articles in the holes of the cylinder and the plungers R stamping them therein after the cylinder has made a quarter-turn, as set forth.

2. In a lozenge-machine, the combination, with a cylinder having holes $q$, a series of corresponding cutters arranged at a distance from said cylinder, and a carrier arranged to deposit the cut articles into the holes of the cylinder, of a movable carriage arranged substantially parallel with the carrier, but on a lower plane, and a series of plungers, as R, mounted on the carriage and adapted to press the lozenges in the cylinder after the cylinder has made a quarter-turn, as set forth.

3. A cylinder having two or more series of holes, $q$, arranged radially, a cutter arranged at a distance from the cylinder, and a carrier arranged on a plane with the top of the cylinder to deposit the lozenges in said holes while they are vertical, in combination with a movable carriage carrying a series of plungers, as R, arranged on a plane with the axis of the cylinder, and connections with power for automatically forcing said plungers in the holes when the cylinder has turned to bring the holes horizontal, as set forth.

4. The combination, with the cylinder having holes $q$, arranged in radial series, cutters arranged at a distance from the cylinder, and a carrier arranged between the cutters and cylinder and on a level with the top of said cylinder, of a carriage, I, carrying plungers R, arranged on a line with the axis of the cylinder, the link L, arm K, rod P, and crank-pin operated from the shaft Q, as set forth.

5. The movable carriage I, arranged to support a series of plungers, R, in combination with a pivoted vibrating lever, 6, having a series of brushes, 8, the whole being arranged and operating substantially as and for the purpose specified.

6. The combination, with the carriage I and arm K, of the link L, the arm M, rod N, connecting the arms K and M, the plungers R $r$, cylinder, and the link O, all arranged for joint operation as set forth.

7. In a lozenge-machine in which the lozenges are withdrawn from the cutters by fingers, as described, the combination of the head $g$, having fingers $f$ carried thereon, and the ledge $k$, having apertures $i$ and $m'$, of the cam-finger $j$, secured to said head $g$, as and for the purposes set forth.

8. The table D, pivoted at the hinge $a$, and having the cutter-head C attached to its other end, in combination with the rod 12, arranged to connect the table D to the crank $b$.

9. The combination of the pivoted table D with a weighted lever, $d$, substantially as and for the purpose specified.

10. The plungers $r$, operating in the holes $q$ in the cylinder, as specified, in combination with a stationary plate, 13, arranged substantially under the axis of said cylinder, as shown, and constructed to remove adhering lozenges from said plungers and deposit them on the carrier without distorting the same, as set forth.

11. The combination, in a lozenge-machine and with the revolving cylinder G thereof and the reciprocating plungers R, of an intermittently-acting stop, 14, arranged and operating substantially as and for the purpose specified.

12. In a lozenge-machine, as described, the combination, with the cylinder having holes $q$, arranged in opposite series, of the plungers R and brushes $v$ and connections whereby the said plungers are moved simultaneously to and from the cylinder, as set forth.

13. In a lozenge-machine, the table D, pivoted near one end, in combination with the counter-weight $c$, the lever $d$, and link $e$, as and for the purposes set forth.

14. In a lozenge-machine, as described, the combination, with the reciprocating table I and means for moving it and its plungers to and from the cylinder, of the lever 6, having an arm, 5, arranged to receive a stroke from the last on the traverse back of said carriage, and having also brushes 8, arranged to be thrown automatically across the plungers when the carriage is withdrawn, as set forth.

15. The combination, with the cylinder and its disks V, having peripheral notches $z$, of the arm S, carrying pawl $y$, the pitman T, shaft U, and push-bars $x$, as and for the purposes set forth.

Toronto, May 6, 1885.

THOMAS ROBERTSON.

In presence of—
 CHARLES C. BALDWIN,
 F. BARNARD FETHERSTONHAUGH.